United States Patent Office 3,523,938
Patented Aug. 11, 1970

3,523,938
STARCH PLASMA EXPANDERS AND
PROCESS OF PREPARATION
Harold Hershenson, Burbank, and Jon M. Brake, Glendale, Calif., and Martin Roberts, Seattle, Wash., assignors to American Hospital Supply Corporation, Evanston, Ill., a corporation of Illinois
No Drawing. Filed Dec. 13, 1967, Ser. No. 690,103
Int. Cl. C08b 19/06
U.S. Cl. 260—233.3      12 Claims

ABSTRACT OF THE DISCLOSURE

Starch plasma expanders of predetermined intravascular persistence are prepared by specific controlled hydrolysis and etherification procedures. A waxy starch composed principally of amylopectin is subjected to acid hydrolysis to reduce the inherent viscosity of the starch, the hydrolysis being terminated at a preselected end point; and the starch either before or after hydrolysis is etherified with ethylene oxide or propylene oxide to an established substitution level, without substantially changing its inherent viscosity. The formation of colored by-products is substantially reduced or eliminated by conducting the hydroxy-ethylation or hydroxypropylation before the controlled hydrolysis. The hydrolyzed and etherified product can be purified to reduce the content of by-product glycol to a clinically acceptable level.

BACKGROUND

For many years there has been a continuous search for suitable plasma volume expanders. Dextrans have been used, and there have been attempts to employ starches. See Thompson et al., J. Pharm. Exp. Therap., vol. 136, 125–132 (1962).

In the use of polysaccharides as plasma substitutes, one of the most critical factors is the intravascular persistence of the polysaccharide after intravenous administration. Since an immediate large effect is desired, the short-term persistence should be as high as possible. However, the long-term persistence should be low or negligible. These objectives tend to be opposed. In general, the higher the short-term persistence, the higher will be the long-term persistence. Consequently, in order to provide plasma expanders which are substantially completely eliminated from the vascular system within reasonable lengths of time, it has been necessary to accept the elimination of substantial percents of the plasma expander within the first few hours after administration. In particular, it has not been possible to prepare plasma expanders from starches which provide short-term persistence as high or higher than dextran expanders without unduly long total persistence. Another unsolved problem has been how to produce starch plasma expanders of predetermined reproducible intravascular persistence.

SUMMARY

Starches are commonly etherified in granule form to permit the recovery of the product by filtration. It is also known to etherify gelatinized starch, and recover the product by spray or drum drying. Neither of these procedures is satisfactory for the purpose of the present invention. In order to obtain starch plasma expanders of predetermined, reproducible intravascular persistence, both short-term and long-term, it has been found necessary to employ specific hydrolysis and etherification steps. The starch, which is preferably composed principally of amylopectin, can be gelatinized and then subjected to a mild acid hydrolysis to reduce the inherent viscosity of the starch. This hydrolysis step is highly critical, and is preferably followed analytically so that the hydrolysis can be terminated at a preselected end point. Preferably, the starch is first etherified and then hydrolyzed. It has been found that the hydrolysis end point should be within the inherent viscosity (IV) range of 0.19 to 0.27 dl./gm. at 25° C. In subsequent processing, the established inherent viscosity is maintained. The etherification with ethylene oxide or propylene oxide is therefore conducted under reaction conditions which promote etherification without changing inherent viscosity. The desired substitution level is within the range of 0.68 to 0.78 ether group per $C_6H_{10}O_5$ mole of starch. In the etherification, some of the etherifying agent will be converted to the corresponding glycol, such as ethylene glycol. It is therefore preferable to purify the starch product to remove glycol.

DETAILED DESCRIPTION

The preferred starting material for practicing the present invention is waxy starch in granule form. For example, waxy milo (sorghum) starch, waxy maize starch, or waxy rice starch can be used. Such waxy starches are composed principally of amylopectin, the amylose content being a minor proportion. Waxy starches for use in the present invention preferably contain 90% or more by weight of amylopectin. Pregelatinized waxy starches can be used, but it has been found convenient to gelatinize the starch immediately prior to or concurrently with the hydrolysis. In other words, the gelatinization and hydrolysis can be one continuous processing step. Thin-boiling waxy starches are particularly suitable, such as those having fluidities of 85 or above. It will be understood that the starch starting material will have a substantially higher inherent viscosity than the desired IV end point after hydrolysis.

For the starches not pregelatinized, the acid hydrolysis conditions are effective for complete gelatinization. Following gelatinization the starch is subjected to acid hydrolysis to reduce its inherent viscosity. The gelatinization and hydrolysis is carried out with the starch in a water suspension. The suspension concentration of the starch is not particularly critical, suitable ratios of starch to $H_2O$ ranging from about 0.65 to 0.75 on a weight:weight basis. The suspension is preferably at a low acid pH, such as a pH from 2.0 to 3.0. The pH can be adjusted with various acids, such as hydrochloric acid, sulphuric acid, etc. The rate of hydrolysis will depend on the temperature. A suitable temperature range is from 85 to 95° C. The hydrolysis preferably proceeds sufficiently slowly so that its progress can be followed analytically, permitting the hydrolysis to be terminated at the selected end point. By taking a series of samples as the hydrolysis proceeds, the time required for completion of the hydrolysis can be determined by extrapolation with rather close accuracy.

Various known procedures may be used for determining inherent viscosity. For example, the viscosity may be determined by flow time in an Ubbelohde viscosimeter, and the measured viscosity corrected for concentration as measured by optical rotation or by the anthrone colorimeter method. The details of suitable analytical procedures will be further described following the specific examples.

In accordance with the process of the present invention the extent of hydrolysis determines the inherent viscosity of the final product. It is therefore essential to preselect the viscosity end point of the hydrolysis step. The final viscosity should be within the IV range of 0.19 to 0.27 dl./gm. at 25° C. The selected inherent viscosity within the range should be correlated with the preselected ether substitution.

The starch either before or after hydrolysis is etherified by reaction with an alkalene oxide such as ethylene or propylene oxide. The etherification should be conducted under basic pH conditions, since the presence of an alkali such as sodium hydroxide, is desirable to promote the etherification reaction. The etherification may be conducted at a pH of from about 11 to 13, with an alkali concentration of from about 8 to 10% based on the starch solids. The temperature of the reaction mixture during the etherification is preferably substantially lower than during the hydrolysis. While the etherification can be carried out at temperatures ranging from 45 to 70° C., temperatures of 50 to 55° C. are preferred. The alkali and temperature conditions of the etherification step should be selected to promote the etherification and achieve the desired substitution level without materially changing the inherent viscosity of the starch. Any hydrolysis of the starch occurring during the etherification should be negligible.

In the etherification step, the same concentration of starch in the suspension can be used as in the hydrolysis step. Consequently, after the conclusion of the hydrolysis, the reaction mixture can be prepared for the etherification by cooling and the addition of sodium hydroxide or other alkali. Preferably, however, the starch is etherified prior to hydrolysis. The sequence has been found to greatly reduce the formation of colored by-products, and therefore no sodium bisulfite or activated carbon treatment are required to produce a white product or colorless solution.

A suitable analytical test for determining substitution level is set out following the specific examples. The substitution should be selected so that the DS is within the range from 0.68 to 0.78. Consequently, the etherified starch will contain from 0.68 to 0.78 molecularly combined ether groups (viz hydroxyethyl or hydroxypropyl) per mole of starch (anhydroglucose unit).

To obtain plasma substitutes of maximized short-term persistence with acceptable long-term persistence, the IV and DS should be correlated. Within the ranges set out, as the IV is increased, the DS can be decreased. For example, an IV of 0.19 preferably correlates with a DS of 0.78, while an IV of 0.27 preferably correlates with a DS of 0.70, etc. Where the IV ranges from 0.21 to 0.25, the DS preferably ranges from 0.70 to 0.75. Plasma expanders thus characterized persist at a high level in the vascular system for the first 2 to 4 hours after administration, while being substantially completely eliminated after a few weeks.

The etherified and hydrolyzed product can be purified to remove glycol and other by-products. For example, ethylene glycol or propylene glycol can be removed by an acetone extraction, or the product can be purified by dialysis. Preferably, the purified material will contain less than 0.5% by weight of glycol after drying. The product can be converted to the form of a dry powder by conventional techniques such as drum drying or spray drying.

This invention is further illustrated by the following specific examples.

EXAMPLE I

Four-pound batches of hydroxyethyl starch (HES) were prepared. The hydrolysis and hydroxyethylation were carried out in a Pfaudler two-gallon glass-lined reactor equipped with a stirrer. The reactor was equipped with a thermometer, a pressure gauge, a sampling tube, and a gas inlet tube. The gas inlet tube was connected to an ethylene oxide cylinder, and also a nitrogen tank and water aspirator.

Hydrolysis 1780 gms. of thin-boiling, 90-fluidity, granule, waxy sorghum starch was suspended in 2500 ml. of distilled water and poured into the reactor. The reactor was sealed and evacuated to 25 in. Hg. The agitator was turned on, and 13 ml. of 1.1 N hydrochloric acid was added through the sample tube. Steam was passed through the jacket of the reactor, until the reactor temperature reached 90° C., and a zero-time sample was taken with a syringe attached to the sample port. The inherent viscosity of the sample was determined. The reaction temperature was maintained at about 90° C. Samples were tested at half-hour intervals and the inherent viscosity (IV) was plotted against time. By extrapolation the end point of the hydrolysis, corresponding to an IV of 0.25 dl./gm., was estimated. The reaction was then terminated by adding 10 ml. of 1 N NaOH and cold tap water was circulated through the jacket.

Hydroxyethylation

When the reaction temperature reached 28° C., the reactor was pressurized with nitrogen to 15 p.s.i. to test for leaks. It was then evacuated to 25 in. Hg, and 400 ml. of 10.5 N NaOH were added. The valves to the ethylene oxide tank were then opened, and 374 gms. of ethylene oxide were added. The reactor pressure was carefully watched, and when it exceeded 15 p.s.i., the ethylene oxide flow was stopped until the pressure dropped.

When all the ethylene oxide had been added, hot tap water (56° C.) was circulated through the reactor jacket. The temperature in the reactor rose slowly to 70–75° C., due to the exothermic reaction; it then fell close to that of the circulating hot water. Heating was continued for ½ hour after the peak temperature was observed. Then cold tap water was passed through the jacket and 705 ml. of 6 N HCl were added. The reactor was opened, and the HES syrup was ladled into a glass flask for storage until the acetone extraction could be performed. The pH of the syrup at this point was about 2.0 and the volume was 5 liters. The substitution (DS) was 0.74–0.75.

Extraction

Five batches of HES syrup (25 liters) prepared as described were placed in a Pfaudler, glass-lined 25-gallon mixing tank and stirred well. 47 ml. of 10 N NaOH were added to bring the pH to 6.0. The neutralized syrup was then placed in a 25-gallon stainless steel kettle and 43 liters of commercial-grade acetone and seven liters of distilled water were added. The mixture was stirred manually for 15 minutes, and then covered and let stand for one hour for the layers to separate. The lower layer (19 liters) was run into a stainless steel pail and the upper layer was collected in 55-gallon drum for later recovery of acetone.

The lower layer was poured into the kettle and 27 liters of acetone and 11 liters of distilled water added. The mixture was stirred, allowed to stand, and separated, as described above, to give 15 liters of the lower layer.

The lower layer was extracted again with 21 liters of acetone plus 9 liters of water to yield 12 liters of viscous syrup. The syrup was stored at 4° C.

Spray-drying

For spray-drying, the HES syrup was diluted with water to give 29% HES (w./v.), the HES concentration of the syrup was determined by polarimetry, the dilution was with 7.5 liters of distilled water. This material was then spray-dried in a Nerco-Niro portable spray-dryer using an inlet temperature of 200° C. and outlet temperature of 118° C. The feed rate was approximately 50 ml./minute, and it required approximately 7 hours to dry the batch.

Drum-drying

In an alternate drying procedure, the HES syrup was drum-dried on a 6" x 8" Blaw-Knox atmospheric double-drum drier at a drum speed of 2.7 r.p.m. and a clearance of 0.035 inch, utilizing 60 p.s.i. steam pressure. A drying rate of about 1.9 pounds/sq. ft./hour was attained.

EXAMPLE II

By conducting the hydroxyethylation or hydroxy-propylation reaction before the hydrolysis, a considerable reduction in the formation of colored by-products is obtained. The following procedure is followed: 1780 grams of starch and 2500 ml. of water are mixed and placed in a 2-gallon Pfaudler reactor. The fittings on the reactor are the same as indicated in Example I. After sealing the reactor, it is evacuated and flushed with nitrogen two times. After another evacuation, 400 ml. of 10.2 N sodium hydroxide are added. Then the reactor is filled with nitrogen and evacuated twice more.

Ethylene oxide (374 gm.) is added at a slow rate so that the reactor pressure does not exceed 10 p.s.i. When all the ethylene oxide has been added and the pressure has dropped below atmospheric pressure the reactor is heated with 45 to 50° C. water in the jacket. A maximum temperature of 55° is reached due to the slightly exothermic reaction; care is taken to prevent the temperature from exceeding 55° by circulating cold water in the jacket as required. After the peak temperature has been obtained the reactor temperature is maintained for 1 hour between 45 and 50° C. by circulating hot water through the jacket. Then 690 ml. of 6 N hydrochloric acid are added. The pH should be 2.0±0.5.

Steam is circulated through the jacket to bring the reactor temperature to 90°±3° C. Samples are drawn at 30 minute intervals for inherent viscosity measurement, as described in the previous examples; however, water is used as the solvent, not sodium hydroxide. When the calculated IV is 0.25±0.03, the hydrolysis is terminated by adding 30 ml. of 1 N NaOH. The reactor is cooled to 30° C. Then 23 ml. of 1.3 N HCl are added and the syrup is removed and stored under nitrogen at 4° C.

The color in the HES syrup prepared by the above method was determined by measuring the optical density of the 1:5 dilution of the syrup with water, followed by filtration through an Ertel #7 filter pad. A 1:5 dilution of HES syrup made by the procedure described in Examples I and II had an O.D. of 0.198 compared to 0.042 for the sample prepared as described above.

EXAMPLE III

The products of Examples I and II can be prepared for administration by dissolving in sterile intravenous solutions, such as normal saline solutions, dextrose solutions, etc. The solution may contain from 4 to 6% by weight of the plasma expander. In one suitable procedure, 6 parts by weight of the hydrolyzed and etherified starch is dissolved in 94 parts by weight of water containing 0.9% sodium chloride to provide a 6% solution of the plasma expander. The solution can be sterilized by autoclaving for 15 minutes at 240° F., and is then ready for administration by intravenous infusion.

EXAMPLE IV

HES was prepared as described in Example I, but in place of the acetone extraction, the following procedure was used:

A Brosites Model B laboratory dialyzer, fitted with 450 P.T. cellophane membranes, was sterilized by filling with 1.5% formaldehyde solution. After 30 minutes, the formaldehyde solution was removed from the dialyzer, which was then filled with sterile distilled water. The wash water was then removed, and the dialyzer refilled with sterile distilled water.

Two liters of HES syrup were pumped through the solution cells of the dialyzer at a flow rate of 4 ml./minute, using a Brosites Model S 2-in-1 proportioning pump. Distilled water was circulated through the water cells of the dialyzer at a flow rate of 10 ml./minute. The residence time of the HES in the dialyzer was 14 hours. The product HES contained less than 0.4% ethylene glycol, on a weight/weight basis.

EXAMPLE V

Hydrolysis

Thin-boiling waxy sorghum starch (238 gm.) was stirred with 335 ml. of water and 3.0 ml. of 1.1 N HCl in a 1-liter glass resin flask fitted with a stirrer, dropping funnel, sampling tube, and manifold leading to a water aspirator and a nitrogen tank. The flask was alternately filled with nitrogen and evacuated a total of 3 times. The flask was then heated to 90° C. in a water bath. At 30 minute intervals samples were withdrawn, and the inherent viscosity of the starch determined. When the IV was calculated to be 0.25, by extrapolation, the reaction was terminated by adding 3 ml. of 1 N NaOH and cooling to 22°.

Hydroxypropylation

Fifty-five ml. of 10.2 N NaOH were added, and then a total of 110 ml. of propylene oxide was added slowly through the dropping funnel. The flask was then heated to 62° and maintained at this temperature for 40 minutes. Then 90 ml. of 6 N HCl were added, the syrup was removed and stored under nitrogen at 4° C.

Acetone extraction

The syrup (700 ml.) was stirred with 1.21 l. of acetone and 210 ml. of water for 15 minutes. It was then allowed to stand for 1 hour, and the supernatant liquid was siphoned off. The precipitate was stirred with 333 ml. of water and 875 ml. of acetone for 15 minutes. After 1 hour of standing, the supernatant liquid was again removed. Then 90 ml. of 6 N HCl were added, the syrup was re-to the precipitate, and the mixture was stirred for 15 minutes. After 1 hour of standing, the supernatant was siphoned off.

Drying

One hundred fifty ml. of HPS syrup were added slowly to 4 liters of acetone and dispersed with a high-shear mixer. The precipitate of HPS was collected by filtration and air dried for 2 days. The product (48 gm.) had an IV of 0.26 and a DS of 0.81.

In controlling the inherent viscosity and degree of substitution, various assay procedures can be used. For example, the average molecular weight of the hydroxyethyl or hydroxypropyl starch can be controlled by measuring the inherent viscosity (IV) of the starch during hydrolysis to a definite end point. The inherent viscosity is defined by the relationship:

$$IV = \frac{\ln \left( \frac{t_{solution}}{t_{solvent}} \right)}{\text{concentration (gm./100 m.)}}$$

where $t_{solution}$ and $t_{solvent}$ are the flow times of the solution and solvent respectively, as measured in a viscosimeter. The solution is 0.8±0.1% starch in 1 N NaOH, which is the solvent. Flow times are measured in an Ubbelohde viscosimeter at 25.0±0.2° C. The exact starch concentration is determined by measurement of the optical rotation of the solution as follows:

Percent starch (g./100 ml.) = O.R. × 0.61 where O.R. is the optical rotation in degrees at 20 to 25° C. using the sodium D line, and a 10 cm. polarimeter tube.

The DS can be determined by reaction with hydriodic acid. The hydroxyalkyl groups are quantitatively converted to ethylene plus ethyl iodide (or propylene plus isopropyl iodide), which in turn are measured by reaction with bromine and silver nitrate respectively. The procedure used is described by Paul W. Morgan, Industrial and Anlytical Chemistry, Analytical Ed. 18, 500–504 (1946).

In producing a purified product, the removal of by-product glycol by acetone extraction is particularly desirable. While acetone is preferred, other equivalent organic solvents can be used, such as isopropyl alcohol. As illustrated by Examples I and V, the etherified hydrolyzed starch product will be obtained in a water solution containing by-product glycol. Where ethylene oxide is employed as the etherifying agent, the by-product glycol will be ethylene glycol, or where propylene oxide is used as the etherifying agent, the by-product will be propylene glycol. The glycols and other by-products can be removed or reduced to an acceptable level by extraction of the water solution with acetone or isopropyl alcohol. The glycols and other by-products will be preferentially extracted into the acetone or isopropyl phase. By multistage or serial batch extraction, the glycol content can be reduced to less than 0.5 part by weight of the glycol per part of the starch product on a dry basis. The product can be extracted at the concentration produced, for example, in a 35–45% by weight aqueous solution. After the glycol has been extracted into the acetone or isopropyl phase, the organic solvent phase can be separated from the water phase by various suitable procedures, such as decanting or centrifuging. It will be understood that continuous extraction equipment can be employed for performing the extraction and separation, such as centrifugal countercurrent extractors.

While in the foregoing specification this invention has been described in relation to preferred embodiments, it will be apparent to those skilled in the art that the invention is susceptible to additional embodiments, and that certain of the details described herein can be varied without departing from the basic principles of the invention.

What is claimed is:

1. The process of preparing a plasma expander of predetermined intravascular persistence, characterized by the steps of:
    (a) subjecting a water suspension of gelatinized starch to acid hydrolysis at a low acid pH to reduce the inherent viscosity of the starch and controlling the rate of hydrolysis to permit the progress of the hydrolysis to be followed analytically,
        said starch being a waxy starch composed principally of amylopectin and a minor proportion of amylose and said hydrolysis being terminated at a preselected end point within the inherent viscosity range of 0.19 to 0.27 dl./gm. at 25° C.; and also
    (b) etherifying said starch with an alkylene oxide selected from the group consisting of ethylene oxide and propylene oxide
        said etherification being carried out under basic pH conditions, either prior to or after said hydrolysis without substantially changing the inherent viscosity of said starch, until a preselected substitution within the DS range of 0.68 to 0.78 is obtained.

2. The process of claim 1 in which said alkylene oxide is ethylene oxide.

3. The process of claim 1 in which said hydrolysis is terminated at an inherent viscosity of 0.21 to 0.25 dl./gm. at 25° C.

4. The process of claim 3 in which said etherification is terminated at a substitution level of 0.70–0.75 ether groups per $C_6H_{10}O_5$ mole of starch.

5. The process of preparing a plasma expander of predetermined intravascular persistance without the formation of colored by-products, characterized by the steps of:
    (a) first etherifying a waxy granule starch composed of amylopectin and amylose and containing at least 90% by weight amylopectin with an alkylene oxide selected from ethylene oxide and propylene oxide, said etherification being performed under basic pH conditions without substantially changing the inherent viscosity of said starch until a substitution of 0.68 to 0.78 hydroxyalkyl groups per $C_6H_{10}O_5$ mole of starch is obtained; and
    (b) then subjecting said etherification waxy starch in a water suspension to gelatinization and acid hydrolysis to reduce the inherent viscosity of the starch,
        said hydroysis being carried out at a pH of about 2–3 and at a temperature at which said hydrolysis proceeds slowly enough to be followed analytically, and terminating said hydrolysis at an end point within the inherent viscosity range of 0.19 to 0.27 dl./gm. at 25° C.

6. The process of preparing a purified plasma expander of predetermined intravascular persistence, characterized by the steps of:
    (a) subjecting a water suspension of gelatinized starch to acid hydrolysis at a low acid pH to reduce the inherent viscosity of the starch and controlling the rate of hydrolysis to permit the progress of the hydrolysis to be followed analytically,
        said starch being a waxy starch composed principally of amylopectin and a minor proportion of amylose and said hydrolysis being terminated at a preselected end point within the inherent viscosity range of 0.19 to 0.27 dl./gm. at 25° C.;
    (b) also etherifying said starch with an alkylene oxide selected from the group consisting of ethylene oxide and propylene oxide,
        said etherification being carried out under basic pH conditions, either prior to or after said hydrolysis without substantially changing the inherent viscosity of said starch, until a preselected substitution within the DS range of 0.68 to 0.78 is obtained, thereby obtaining an etherified product containing a glycol by-product selected from the group consisting of ethylene glycol and propylene glycol; and
    (c) extracting a water solution of said product with an organic solvent selected from the class consisting of acetone an isopropyl alcohol to reduce the content of said glycol by-product therein.

7. The process of preparing a purified plasma expander of predetermined intravascular persistence without the formation of colored by-products, characterized by the steps of:
    (a) first etherifying a waxy granule starch composed of amylopectin and amylose and containing at least 90% by weight amylopectin with etheylene oxide,
        said etherification being performed under basic pH conditions without substantially changing the inherent viscosity of said starch until a substitution of 0.68 to 0.78 hydroxyalkyl groups per $C_6H_{10}O_5$ mole of starch is obtained;
    (b) next subjecting said etherified waxy starch in a water suspension to gelatinization and acid hydrolysis to reduce the inherent viscosity of the starch,
        said hydrolysis being carried out at a pH of about 2–3 and at a temperature at which said hydrolysis proceeds slowly enough to be followed analytically, and terminating said hydrolysis at an end point within the inherent viscosity range of 0.19 to 0.27 dl./gm. at 25° C.,
    thereby obtaining an etherified hydrolyzed starch product in a water solution containing ethylene glycol as a by-product; and
    (c) extracting said water solution with an organic solvent to preferentially extract said ethylene glycol,
        said organic solvent being selected from the class consisting of acetone and isopropyl alcohol and said extraction being continued until said water solution contains less than 0.5 part by weight of ethylene glycol per part of said starch product.

8. A plasma expander consisting essentially of modified waxy starch characterized by:
    (a) being composed substantially of amylose and amylopectin and containing at least 90% by weight amylopectin;
(b) having an inherent viscosity of 0.19 to 0.27 dl./gm. at 25° C.; and
(c) being substituted with from 0.68 to 0.78 ether groups per starch mole, said ether groups being selected from hydroxyethyl and hydroxypropyl groups.

9. The plasma expander of claim 8 in which said ether groups are hydroxyethyl groups.

10. The plasma expander of claim 8 in which said ether groups are hydroxypropyl groups.

11. A plasma expander consisting essentially of hydrolyzed, etherified and purified waxy starch characterized by:
(a) being composed substantially of amylose and amylopectin and containing at least 90% by weight amylopectin;
(b) having an inherent viscosity of 0.21 to 0.25 dl./gm. at 25° C.;
(c) being substituted with from 0.70 to 0.75 ether groups per starch mole, said ether groups being hydroxyethyl groups; and
(d) containing less than 0.5 part by weight of ethylene glycol per 100 parts of said modified starch.

12. A plasma expander consisting essentially of hydrolyzed, etherified and purified waxy starch characterized by:
(a) being composed substantially of amylose and amylopectin and containing at least 90% by weight amylopectin;
(b) having an inherent viscosity of 0.21 to 0.25 dl./gm. at 25 C.;
(c) being substituted with from 0.70 to 0.75 ether groups per starch mole, said ether groups being hydroxypropyl groups; and
(d) containing less than 0.5 part by weight of propylene glycol per 100 parts of said modified starch.

References Cited

UNITED STATES PATENTS 2,732,309  1/1956  Kerr _____ 106—213
3,067,067  12/1962  Etheridge et al. _____ 127—71

DONALD E. CZAJA, Primary Examiner

M. I. MARQUIS, Assistant Examiner

U.S. Cl. X.R.

106—213; 127—36, 38; 424—180, 361